Patented Oct. 24, 1950

2,526,839

UNITED STATES PATENT OFFICE 2,526,839

METHOD OF REPRESSING THE GENERATION OF CHLORINE DIOXIDE

Royden N. Aston, Lewiston, N. Y., assignor to Mathieson Chemical Corporation, a corporation of Virginia No Drawing. Application February 1, 1947, Serial No. 725,965

7 Claims. (Cl. 252—187)

This invention relates to a method for repressing the generation of chlorine dioxide in acid aqueous solutions of chlorites.

Chlorites, particularly the chlorites of the alkali and alkaline earth metals, are extensively used with advantage in various commercial operations, for example, in pulping and bleaching in the paper industry, in the bleaching of other various materials including textiles and the like and in various oxidation processes. In many instances, it has been found particularly advantageous to use the chlorites in acid aqueous solutions. However, such use has heretofore frequently been accompanied by certain disadvantages.

It is known that in acid aqueous solutions the chlorites decompose to a greater or less extent to form chlorine dioxide. There has been considerable speculation as to the relative effectiveness of the chlorine dioxide and the chlorite ion, respectively, in such operations. However, difficulties arising out of the evolution of chlorine dioxide in such operations are well recognized.

Frequently, commercial operations using acid aqueous chlorite solutions are conducted in metal tanks or vats. Chlorine dioxide is very corrosive and even where vessels fabricated of certain types of stainless steel are used, excessive evolution of chlorine dioxide tends to cause corrosion or pitting of the metal surfaces, particularly portions thereof exposed to the vapor phase adjacent to the surface of the solution. Accordingly, the evolution of chlorine dioxide is frequently objectionable from the standpoint of corrosion. Further the escape of chlorine dioxide gas from the solution represents a loss in bleaching or oxidation value, and, if excessive, may also result in objectionable atmospheric conditions in the vicinity of the operation.

Also, excessive concentrations of chlorine dioxide tend to cause a discoloration of animal fibers such as wool and silk, usually tending toward a reddish or yellowish cast. Also, in the bleaching of sponges, using acid chlorite solutions, excessive concentrations of chlorine dioxide may result in color instability of the sponge. Further, in laundry wash rooms, where chlorites are used in the scouring step of commercial laundry operations to combine scouring and bleaching, which rooms are frequently congested and inadequately ventilated, the escape of substantial quantities of chlorine dioxide into the atmosphere is particularly objectionable both from the standpoint of the personnel and from the standpoint of possible corrosion of metal equipment.

In accordance with U. S. Patent 2,358,866 to MacMahon dated September 26, 1944, chlorine dioxide evolution from acidified chlorite solutions is repressed by the presence in the solution of hydrogen peroxide. The hydrogen peroxide may be added to the solution as such or there may be added compounds, such as sodium percarbonate or sodium perborate which yield hydrogen peroxide in the environment of the solution. The method of my invention insofar as it involves the use of hydrogen peroxide is in the nature of an improvement over the method of this prior patent.

I have discovered that water soluble pyrophosphates and polyphosphates are effective as repressers of chlorine dioxide generation in acid aqueous chlorite solutions and I have further discovered that when hydrogen peroxide and such a phosphate are used conjointly, the total effect of the two agents is greater than the sum of the two effects taken independently. My invention thus resides in the method of repressing or retarding chlorine dioxide formation in acid aqueous chlorite solutions which comprises including in the solution, preferably along with hydrogen peroxide, a water soluble pyrophosphate or polyphosphate.

I cannot define with certainty the nature of the chemical reaction involved in my invention. However, the utility thereof is not independent upon the accuracy of any theory which could be presented. In referring herein to the formation, generation or evolution of chlorine dioxide, I do not intend to distinguish between a condition where the actual formation of chlorine dioxide is retarded or prevented and a condition where the chlorine dioxide is formed but is so rapidly converted to the chlorite or to some other unobjectionable compound that it does not accumulate in the solution.

In the practice of the preferred embodiment of my invention, I generally use the so-called 100 volume hydrogen peroxide but peroxide solutions of greater or lesser concentration may be employed or the peroxide may be formed in the solution as previously indicated by the addition of a per-salt or other suitable substance. While other water soluble pyrophosphates and polyphosphates, for example, potassium pyrophosphate and potassium polyphosphate, are applicable to the invention, I prefer the more readily available sodium compounds, e. g. sodium pyrophosphate, sodium hexametaphosphate, sodium tetrametaphosphate, sodium tetraphosphate, sodium tripolyphosphate etc. especially when operating with solutions of sodium chlorite. The addition compound of hydrogen peroxide with sodium pyrophosphate is a suitable source of both phosphate and peroxide.

The synergistic effect obtaining upon the conjoint use of hydrogen peroxide and the pyrophosphate or polyphosphate appears to be independent of either the total or the relative concentrations of the two materials, but it is ordinarily advantageous to operate with solutions in which the ratio of phosphate to peroxide on a weight basis is within the range 0.01:1 to 8:1 and which have a total represser concentration within the range 0.75 gm./l. : 75.0 gms./l. The total concentration of the two repressers, as well as the relative concentrations, is naturally dependent upon the amount of chlorite in the solution, that is upon the concentration of available chlorine, and also upon other factors, particularly the temperature and pH at which the solution is operated, the degree of chlorine dioxide repression desired and the presence or absence of material capable of taking up chlorine dioxide as generated, e. g. cloth to be bleached. Highly acid solutions, operated at the boiling point, having a high chlorite concentration and not containing colored cloth or other material capable of taking up chlorine dioxide require the highest total concentration of the repressers and the highest ratio of phosphate to peroxide. Thus, to substantially repress chlorine dioxide formation in a boiling solution of sodium chlorite having an available chlorine concentration of the order of 8 gms./l. and a pH of 3.2–3.7, a peroxide concentration of 3.5–4 gms./l. and a phosphate concentration of 25–30 gms./l. is necessary in the absence of material capable of taking up chlorine dioxide. On the other hand where the solution is operated at room temperature, contains material to be oxidized or bleached, and is only slightly acid, as little as 0.25 gm./l. of peroxide and 0.5 gm./l. of phosphate may be sufficient.

As indicated, solutions containing the repressers may be operated at temperatures of from about 20° C. to about 212° C. Various acids and salts may be used to maintain the solution at the desired hydrogen ion concentration, but I generally use either formic acid, acetic acid or phosphoric acid. The invention is applicable to solutions having a pH of from 7 to about 3. For substantial repression of chlorine dioxide evolution, solutions having a pH of 3 or less should contain a relatively low concentration of chlorite and should be operated at a low temperature, preferably at room temperature, particularly where no oxidizable or bleachable material is present.

Chlorite solutions may be used, for example, in the bleaching or solubilizing of starch, in the treatment of cellulosic materials such as cotton, linen, paper pulp, rayon, cellulose acetate and other cellulose esters and ethers including mixed types, for example, cellulose acetate-butyrate, in the bleaching of straw such as used in hat-making, in the treatment of oils, fats and waxes and in the treatment of synthetic protein-like fibers, including materials such as nylon, Aralac and the like.

The following examples submitted in illustration of the invention are not to be taken as in any way limiting the scope thereof:

Example I

An aqueous solution containing 3.98 grams per liter of available chlorine as sodium chlorite was prepared. Three samples of the solution were buffered at a pH of 4 and maintained at 80° C. for 30 minutes during which time they were aerated to remove chlorine dioxide. The amount of chlorine dioxide generated, determined by absorption in potassium iodide solution and titration with a standard thiosulfate solution was 54.8, 58.2, and 56.4 mgs., respectively.

To another sample of the solution was added 1 gm. per liter of sodium tetraphosphate, $Na_6P_4O_{13}$. When subjected to the same conditions this sample generated only 34.6 mgs. of chlorine dioxide.

Three samples of the solution each containing 1 gm. per liter of hydrogen peroxide (100 volume) generated 24.1, 22.6 and 21.7 mgs. of chlorine dioxide.

A sample containing 1 gm. per liter each of sodium tetraphosphate and peroxide generated only 9.8 mgs. When the concentration of the phosphate was increased to 2 gms. per liter with no increase in hydrogen peroxide concentration, the weight of the chlorine dioxide evolved was 7.0 mgs. Reduction of the phosphate concentration to 0.1 gm. per liter increased the chlorine dioxide evolution to 10.3 mgs. Upon still further reduction of the phosphate concentration to 0.01 gm. per liter the amount of chlorine dioxide evolved increased to 16.3 mgs.

Example II

In a blank test conducted as above, a sample of a solution containing 4.0 gms. per liter of available chlorine as sodium chlorite evolved 56.5 mgs. of chlorine dioxide. The addition of 1 gm. per liter of tetrasodium pyrophosphate reduced the gas generation to 46.3 mgs., 82% of the amount generated in the blank test while the addition of 1 gm. per liter of peroxide in the absence of pyrophosphate reduced the amount of gas to about 40.5% of that generated in the blank test.

In the case of two samples each containing 1 gm. per liter of peroxide and 1 gm. per liter of the pyrophosphate, the chlorine dioxide evolved amounted to 9.4 and 8.6 mgs. or an average of 9.0 mgs. When the amount of pyrophosphate was doubled, the peroxide concentration remaining the same, only 4.3 mgs. of chlorine dioxide were evolved. Two samples containing 1 gm. per liter of peroxide and 0.1 and 0.01 gm. per liter, respectively, of the pyrophosphate evolved 18.4 and 20.4 mgs. of chlorine dioxide.

Example III

To a sample of a chlorite solution having an available chlorine content of 4.0 gms. per liter was added 1 gm. per liter of hydrogen peroxide. This reduced the chlorine dioxide generation under the conditions in Example I from 56.5 mgs. to about 22.8 mgs.

To a second sample was added 1 gm. per liter each of peroxide and sodium hexametaphosphate. When tested in the usual manner the amount of chlorine dioxide evolved was only 11.6 mgs. Upon reduction of the phosphate concentration to 0.1 and .01 gm. per liter, respectively, the chlorine dioxide evolved amounted to 12.9 and 19.1 mgs., respectively.

Example IV

A solution containing about 4 gms. per liter of available chlorine as sodium chlorite and 1 gm. of 100 volume hydrogen peroxide was buffered at pH 3 and aerated for 30 minutes at 80° C. 273.5 mgs. of chlorine dioxide were evolved. When 1 gram per liter of tetrasodium pyrophosphate was added to a similar solution, only 126.8 mgs. of chlorine dioxide were evolved under the same conditions.

Example V

Substantially complete repression of chlorine dioxide formation was obtained at 210° F. with a solution containing 3 gms. per liter of available chlorine as sodium chlorite and buffered at pH 3.5 by the addition of 2.3 ml. per liter of 100 volume hydrogen peroxide and 4.85 grams per liter of tetrasodium pyrophosphate.

Example VI

To a solution of sodium chlorite containing 2 grams per liter of available chlorine and having a pH of 3.5 was added 2.3 ml. per liter of 100 volume hydrogen peroxide and 5 grams per liter of tetrasodium pyrophosphate. On aerating the solution at 210° F. for 30 minutes, substantially no chlorine dioxide was formed. An acetic acid-sodium acetate buffer was used to attain the stated pH.

Example VII

A solution of sodium chlorite buffered at pH 3.5 and containing 1 gm. per liter of available chlorine, 2.3 ml. per liter of 100 volume hydrogen peroxide and 4 gms. per liter of tetrasodium pyrophosphate on aeration for 30 minutes at 210° F. showed substantially no evolution of chlorine dioxide.

Example VIII

An aqueous solution having a pH of 3.5 and containing 1 gm. per liter of available chlorine as sodium chlorite, 2 ml. per liter of 100 volume hydrogen peroxide and 7 gms. per liter of sodium tripolyphosphate was heated at the boiling point for 15 minutes. The chlorine dioxide evolved was absorbed and titrated. It amounted to only 5.5 mg.

Example IX

An aqueous solution containing 3 gms. per liter of available chlorine as sodium chlorite, 25 gms. per liter of sodium tripolyphosphate, 2 ml. per liter of 100 volume hydrogen peroxide and 10 ml. per liter of formic acid was prepared. This solution, having a pH of 3.55 was heated at 97–98° C. for 15 minutes and the amount of chlorine dioxide evolved determined by the usual method. It amounted to only 5.4 mg.

Example X

For bleaching a textile composed of cotton warp and a filling of 31% Aralac (casein fiber) and 69% of spun viscose rayon, a bleaching solution was prepared containing 2.4 gms. per liter of available chlorine as sodium chlorite, 2 gms. per liter of tetrasodium pyrophosphate, 1.4 gms. per liter of 100 volume hydrogen peroxide and 1.4 gms. per liter of formic acid. The solution had a pH of 3.7–3.9. During 2 hours the solution was held at 180° F. while 15 parts of the cloth per part of solution was bleached. A high white was obtained on rinsing, no gas was formed and there was no corrosion of the stainless steel equipment.

Example XI

A sample of broad-cloth was bleached in 500 ml. of solution having a pH of 3.9 and containing 1.51 grams of sodium chlorite, 30 grams of sodium acid pyrophosphate ($Na_2H_2P_2O_7$) and 0.5 ml. of 100 volume hydrogen peroxide. After washing and drying, the cloth had a brightness of 87.0 and substantially no chlorine dioxide was formed during the bleach.

Example XII

A solution containing in 500 ml. 1.51 gms. of sodium chlorite, 3 gms. of tetrasodium pyrophosphate, 1.6 gms. of sodium pyrophosphate-peroxide (double compound), 5 gms. of sodium dihydrogen phosphate ($NaH_2PO_4$) and 3 ml. of 85% phosphoric acid was held at a slow boil for 15 minutes and aerated into a tower containing a solution of potassium iodide. Titration showed the generation of only 1.75 mgs. of chlorine dioxide. The aerated solution had a pH of 3.52.

I claim:

1. The method of repressing the generation of chlorine dioxide in an aqueous chlorite solution maintained at a pH between 7 and about 3 which comprises including in the solution a phosphate of the group consisting of the water soluble pyrophosphates and polyphosphates.

2. The method of repressing the generation of chlorine dioxide in an aqueous chlorite solution maintained at a pH between 7 and about 3 which comprises including in the solution hydrogen peroxide and a phosphate of the group consisting of the water soluble pyrophosphates and polyphosphates.

3. The method of repressing the generation of chlorine dioxide in an aqueous chlorite solution maintained at a pH between 7 and about 3 which comprises including in the solution hydrogen peroxide and a phosphate of the group consisting of the water-soluble pyrophosphates and polyphosphates, the phosphate to peroxide ratio being within the range 0.01:1 to 8:1 and the total concentration of the phosphate and peroxide not exceeding 75 grams per liter.

4. The method of claim 3 as practiced with sodium pyrophosphate.

5. The method of claim 3 as practiced with sodium tetraphosphate.

6. The method of claim 3 as practiced with sodium hexametaphosphate.

7. The method of repressing the generation of chlorine dioxide in an aqueous chlorite solution maintained at a pH between 7 and about 3 which comprises including in the solution synergistic proportions of hydrogen peroxide and a phosphate of the group consisting of the water-soluble pyrophosphates and polyphosphates.

ROYDEN N. ASTON.

REFERENCES CITED

The following references are of record in the file of this patent:

UNITED STATES PATENTS

| Number | Name | Date |
|---|---|---|
| 2,012,462 | Agthe et al. | Aug. 27, 1935 |
| 2,071,091 | Taylor | Feb. 16, 1937 |
| 2,358,866 | MacMahon | Sept. 26, 1944 |